Patented Aug. 29, 1933

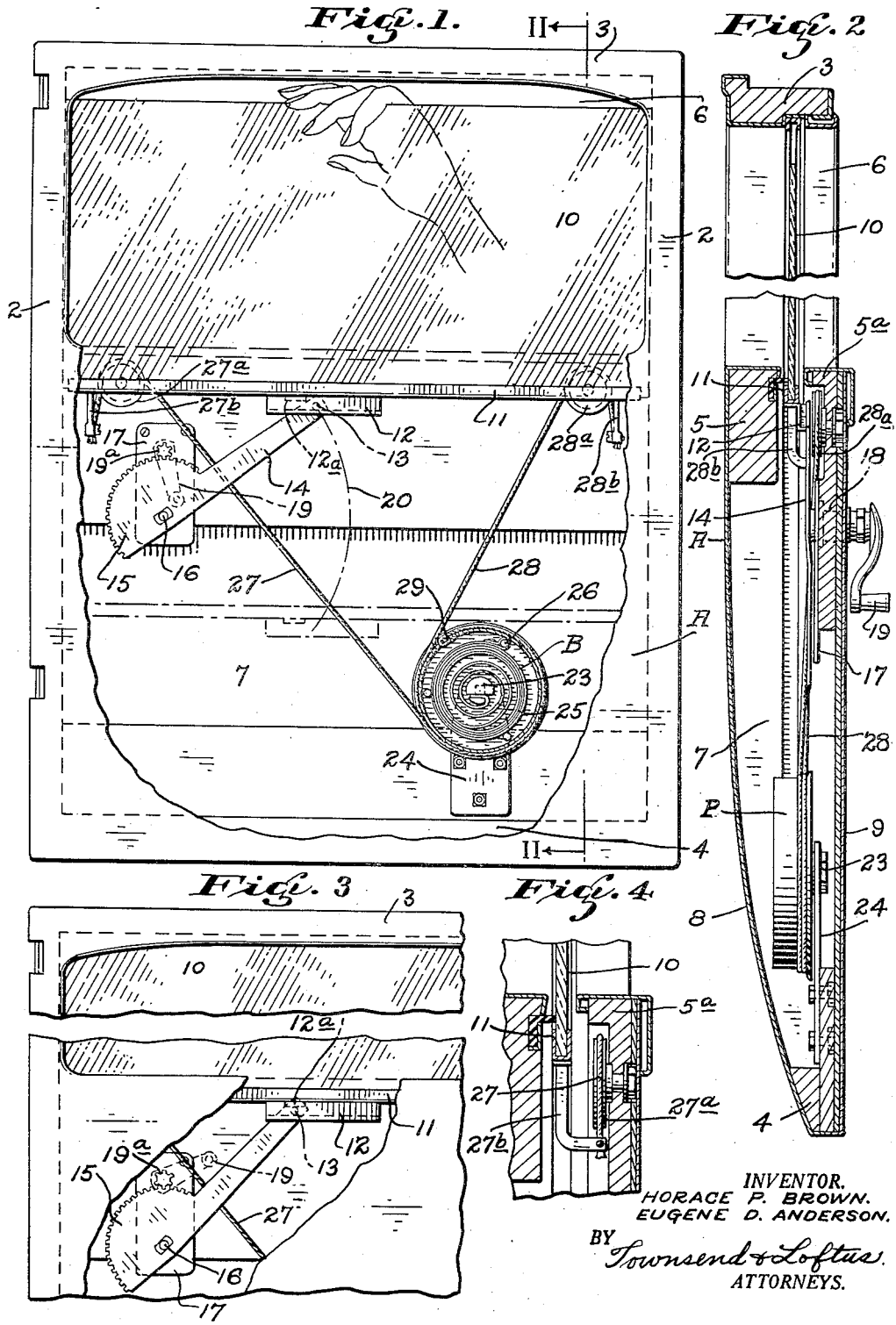

1,924,706

UNITED STATES PATENT OFFICE 1,924,706

WINDOW OPERATING MECHANISM

Horace P. Brown, Oakland, and Eugene D. Anderson, Alameda, Calif.; said Anderson assignor to said Brown; Clara B. Brown executrix of said Horace P. Brown, deceased Application April 5, 1932. Serial No. 603,336

6 Claims. (Cl. 268—126)

This invention relates to a window operating mechanism for automobiles and other vehicles, and particularly to a mechanism which permits lowering of the window by downward pressure thereon and automatic return or raising of the window when downward pressure is released.

In the operation or driving of automobiles it is essential and, in fact, required by law, that a signal be given when turning to the right or lift and also when slowing down or when coming to a stop. The most common method of signaling is arm signaling. This necessitates extension of the driver's arm through the window but, before the arm can be extended, the window must be lowered. Practically all windows are raised or lowered by a hand crank and connecting mechanism and this takes time and, if a person is driving in congested traffic where is it necessary to give frequent signals, it is almost necessary to leave the window fully open, thereby subjecting the driver and other occupants of the car to excessive draft, entrance of rain, et cetera, during inclement weather.

The object of the present invention is to overcome the objections above referred to by providing a window operating mechanism, whereby the window may be raised to any position desired and then lowered by a slight downward pressure of the driver's hand or arm so as to permit quick and ready extension of the arm when a signal is to be given; and further, to provide means for automatically returning the window to raised position the moment the arm is retracted, thereby giving the driver and other occupants of the car full protection against draft wind, or rain, without interfering with the driver's ability to signal.

The invention is shown by way of illustration in the accompanying drawing, in which—

Fig. 1 is an inside view of an automobile door showing the application of the invention.

Fig. 2 is an enlarged vertical cross section taken on line II—II of Fig. 1.

Fig. 3 is a fragmentary view showing the position assumed by the sector crank arm when the window is fully raised.

Fig. 4 is a fragmentary cross section showing the manner in which the cables are attached to the window.

Referring to the drawing in detail and particularly Figs. 1 and 2, A indicates an automobile door comprising side frame bars 2—2, top and bottom cross frame bars 3 and 4, and an intermediate cross frame bar 5 which divides the door into two sections, to-wit, an upper section containing a window opening 6 and a lower section containing a pocket 7.

The several bars forming the frame of the door may be assembled and secured in the usual manner and the exterior and interior surfaces of the door may be provided with a metal covering, such as indicated at 8 and 9, or any other suitable material may be employed. The intermediate cross frame bar forms the sill of the window opening and it consists of two sections 5 and 5a, which are spaced apart a sufficient distance to form a slot through which a window 10 may freely operate. Guideways are formed in the inner faces of the side frame bars 2—2 to receive and guide the window and, while a number of different types of mechanisms may be provided for raising and lowering the window, a type rather commonly employed is illustrated and will be described.

The window raising and lowering mechanism here illustrated consists of a channel bar 11 which supports and secures the window 10. Secured to the lower edge of the channel bar substantially midway between its ends is an angle bar 12, and engageable with a base flange of the angle bar is a pin or roller 13 secured to the outer end of a crank arm 14 which forms a part of a gear sector 15. The gear sector is supported by a pin 16 or other suitable bearing member and is adapted to rotate about the same. The pin, in turn, is secured in a bearing plate 17 secured on the inner face of the cross bar 5a and this plate, together with the cross bar, also forms a bearing for a shaft 18 on the inner end of which is secured a gear pinion 19a which meshes with the teeth of the gear sector 15. The shaft 18 is also provided with a hand crank 19 disposed within convenient reach of the driver. When this crank is grasped and rotated in one direction, the gear segment, together with the crank arm 14, will swing downwardly in the direction of the dot and dash line indicated at 20. Pin 13 on the outer end of the crank arm will, during such movement, engage the base flange of the angle bar 12 and thus pull the window downwardly into the pocket 7.

In mechanisms of this character a channel bar is usually substituted for the angle bar here shown so that when the hand crank 19 is rotated in a reverse direction the pin 13 will engage the upper flange of the channel and thus move the window upwardly to a closed position. In the present instance, a positive connection between the pin 13 and the bar 12 is not desired, hence means other than the crank 14 and pin 13 must be provided for raising the window. In the present instance a spring actuated reel or sheave is journaled on a pin 23 which is secured in a bracket 24 carried by the lower frame bar 4 of the door. Mounted within the sheave is a clock spring 25. This spring has a considerable number of turns so as to provide a substantially constant tension during movement of the window 10, as will hereinafter be described. The inner end of the spring is secured to the pin 23, while the outer end of the spring is secured to a pin 26 which is, in turn, secured to the sheave B. A pair of wire cables, such as shown at 27 and 28, are secured in one end to the sheave as at 29, while the opposite ends are passed over pulleys 27a and 28a. These pulleys are journaled in the upper part of the cross frame bar 5a. The cable 27 passes over the pulley 27a and the free end of the cable is attached to an anchor arm 27b, which, in turn, is secured to the channel bar 11. The cable 28 passes over the pulley 28a and the free end of the cable is secured to an anchor arm 28b secured to the opposite end of the channel bar 11.

The spring 25 within the reel or sheave B will under all conditions have sufficient tension to raise the window to a fully closed position, hence if the window is lowered by means of the hand crank 19, pin 13 will engage the angle bar and pull the window downwardly into the pocket. The cables surrounding the sheave or reel B will, during such movement, unwind and, if anything, place the spring 25 under greater tension but in view of the fact that the spring consists of numerous coils the increased tension will be almost imperceptible. If the hand crank is rotated in the opposite direction, the reel will rotate in the opposite direction due to the pull or tension of the spring 25. The cables will, accordingly, rewind themseves about the sheave and the window will follow the pin 13 and raise in unison therewith. Hence, manually operated means are provided for lowering the window and spring actuated means are employed for raising the window. This is an important feature as one of the main objects of the present invention is that of permitting quick lowering of the window without actuation of the hand crank 19. This will be more fully understood from the following:

In the operation or driving of automobiles it is essential and, in fact, required by law, that a signal be given when turning right or left and also when slowing down or coming to a stop. The most common method of signaling is arm signaling. This necessitates extension of the driver's arm through the window, hence it is essential that means be provided for quickly lowering the window so that the arm can be extended at the proper time. If the driver, as is usually the case, has to stop to rotate the hand crank 19 to lower the window, it is very possible that the signal may be given too late and an accident may be the result. Hence, when driving in congested traffic where it is necessary to give frequent signals it is almost necessary to leave the window fully open. There is no objection to this, for instance in warm weather, but if a driving rain or high wind is encountered it is certainly undesirable. By employing the mechanism here illustrated, the window may be maintained in a substantially closed position and, in fact, in the position shown in Fig. 1. If the driver desires to extend his arm to give a signal, he merely grasps the upper edge of the window, as shown in Fig. 1, and pulls the window downwardly. A comparatively slight pull or pressure is all that is required, as the tension of the spring 25 may be adjusted to permit the window to be readily depressed. The moment the window is depressed the arm can be freely extended and the signal given and the moment the arm is retracted and the window is relieved of pressure the spring will immediately re-reel the cables 27 and 28 and thus raise or return the window to its former substantially closed position.

If a channel bar was employed in place of the angle bar, indicated at 12, such downward depression of the window by exerting downward pressure on the window would be impossible as the pin 13 of the crank arm would engage the upper bar of the channel bar, but, as an angle bar is employed as previously described, the window, together with the channel bar 11 and angle bar 12, can move freely in a downward direction away from the pin 13. This is what actually takes place when the window is lowered by downward pressure of the hand or arm, and when the arm is withdrawn and the window is relieved of pressure the spring and attached cables will immediately return the window to raised position. The distance the window is raised depends upon the position of the crank arm 14 and the pin 13, as the moment the lower flange of the angle bar engages the pin 13 further upward movement is checked, thus, by adjusting the position of the crank arm 14 and pin 13 by means of the hand crank 19 the window may be maintained in any raised position desired and it will always return to this position after lowering as the moment the window is relieved of downward pressure it will be returned by the spring and cables and the upward movement will only be checked when engagement is made with the pin 13.

In view of the fact that the window can be lowered at any time desired by a mere application of downward pressure, it is obvious that it would be impossible to close the window and lock the car and any unauthorized person could come along and exert a sufficient downward pressure from the outside and thereby open the window and then the door. Hence, means have been provided for positively dogging or locking the window when in fully raised position. This is accomplished by providing a lug such as shown at 12a. This lug forms the equivalent of an upper channel bar. When the window is raised to a completely closed position pin 13 will pass in under the lug 12a, see Fig. 3, and the window will then be positively dogged or locked against depression. The only way in which the window can be opened from this position is by rotating the hand crank to move pin 13 out of engagement with lug 12a, as shown in Fig. 1, and as this can only be done from the inside of the car unauthorized persons will not be able to lower the window and enter the car.

Summarizing the salient features of the invention, it should be noted that the sector 15, together with the crank arm 14 and pin 13, has two functions; first, that of an actuator, and secondly, that of an adjustable stop member to limit upward movement of the window. The spring reel B at all times exerts a pull on the cables 27 and 28 and, as such, tends to maintain the window in a raised position and, if it were not for the pin 13 limiting such upward movement, the window would always return to a completely closed position when relieved of downward pressure. By adjusting the position of the crank arm 14 and the pin 13, an adjustable stop is provided which limits the upward vertical movement of the window, hence the window will always be automatically raised to any predetermined height or elevation desired due to the provision of the adjustable stop. Furthermore, as the pin or stop 13 also acts as an actuator, the window can be mechanically lowered by actuation of the hand crank 19.

While certain features of the present invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is—

1. In a window operating mechanism a window mounted for vertical movement, mechanically actuated means for lowering the window, said means also functioning as an adjustable stop to limit raising movement of the window, said means permitting direct manual lowering of the window by application of downward pressure on the window, and a common means for raising the window whether mechanically or manually lowered.

2. In a window operating mechanism a window mounted for vertical movement, a manually operated actuator engageable with the window to lower the same and also adapted to function as a stop member to limit upward movement of the window, said actuator permitting direct manual lowering of the window by application of downward pressure upon the window, and a common means for raising the window into engagement with the combination actuator and stop member when the window has been manually lowered and for maintaining the window in engagement with the stop member when mechanically lowered or raised.

3. In a window operating mechanism, a window mounted for vertical movement, mechanism for lowering the window to any predetermined position within the range of movement of the window, said window also adapted to be manually depressed to a position lower than the predetermined position to which it has been mechanically lowered, and means for automatically returning or raising the window to the mechanically predetermined lowered position.

4. In a window operating mechanism, a window mounted for vertical movement, an adjustable stop member with which the window is engageable at any point intermediate its range of movement, and means exerting an upward lifting force to raise the window into engagement with the adjustable stop member, said means permitting the window to be manually depressed and lowered with relation to the stop member and when released to automatically raise the window into engagement with the stop member regardless of the position of said stop member.

5. In a window operating mechanism, a frame having a window opening formed therein, a window vertically movable in said opening, a hand crank operable from the inner face of the window frame, an adjustable stop member operated by the hand crank and engageable with the window to pull the window from a raised closed position to a lowered full open position or to any intermediate position, said adjustable stop permitting manual depression of the window to any point below the adjustable stop when the stop assumes an intermediate position, and spring actuated means normally maintaining the window in engagement with the adjustable stop.

6. In a window operating mechanism, a frame having a window opening formed therein, a window vertically movable in said opening, a hand crank operable from the inner face of the window frame, a gear train actuated by the hand crank, a pivotally mounted arm actuated by the gears, a pin on the free end of the arm, a bracket on the window engageable with the pin, said window and bracket being freely movable in a downward direction away from the pin but being held against upward movement by the pin, and spring actuated means normally maintaining the bracket and window in engagement with the pin.

HORACE P. BROWN.
EUGENE D. ANDERSON.